United States Patent [19]

Sumitani

[11] Patent Number: 4,917,434
[45] Date of Patent: Apr. 17, 1990

[54] CONSTRUCTION OF SIDE CORNER PORTION OF MOTOR VEHICLE

[75] Inventor: Keiji Sumitani, Susono, Japan
[73] Assignee: Toyota Jidosha Kabushiki Kaisha, Aichi, Japan
[21] Appl. No.: 124,105
[22] PCT Filed: Jan. 9, 1987
[86] PCT No.: PCT/JP87/00014
§ 371 Date: Oct. 28, 1987
§ 102(e) Date: Oct. 28, 1987
[87] PCT Pub. No.: WO88/01585
PCT Pub. Date: Mar. 10, 1988

[30] Foreign Application Priority Data

Aug. 29, 1986 [JP] Japan ................. 61-203294

[51] Int. Cl.⁴ ............. B62D 35/02; B62D 32/00
[52] U.S. Cl. ..................... 296/180.1; 98/2;
  105/1.2; 293/102; 296/91
[58] Field of Search .......... 296/15, 91, 180.1, 180.2,
  296/180.3, 180.4, 180.5; 293/102; 98/2.01, 2,
  2.19; 105/1.1, 1.2, 1.3

[56] References Cited

U.S. PATENT DOCUMENTS

| | | | |
|---|---|---|---|
| 1,923,349 | 8/1933 | Wolverton | 296/15 |
| 3,591,229 | 7/1971 | Wilfert et al. | 296/15 |
| 3,672,718 | 6/1972 | Broyer | 296/15 |
| 3,721,466 | 3/1974 | Abrams | 296/15 |
| 3,836,191 | 9/1974 | Gotz | 296/15 |
| 3,892,438 | 7/1975 | John | 296/15 |
| 4,320,920 | 3/1982 | Goudey | 296/15 |
| 4,384,630 | 5/1983 | Steiner | 296/15 |

FOREIGN PATENT DOCUMENTS

| | | |
|---|---|---|
| 3630435 | 3/1988 | Fed. Rep. of Germany ...... 296/15 |
| 57-143985 | 3/1982 | Japan . |
| 60-95370 | 6/1985 | Japan . |
| 188684 | 12/1985 | Japan . |
| 60-189476 | 12/1985 | Japan . |
| 61-47779 | 3/1986 | Japan . |

OTHER PUBLICATIONS

*SAE Technical Paper*, "Development of Aero-Slit", Sumitani and Yamada, No. 890370, Feb. 27, 1989.

*Primary Examiner*—Andres Kashnikow
*Assistant Examiner*—Matthew C. Graham
*Attorney, Agent, or Firm*—Oliff & Berridge

[57] ABSTRACT

A construction of side corner portions of a motor vehicle, wherein air blow-out openings are respectively formed on right and left side corner portions at least either on a front portion or on a rear quarter portion of the motor vehicle, and, when crosswind is received during running of the motor vehicle, air is blown out through the air blow-out opening of the side corner on the leeward side, whereby air stream generated along the side corner on the leeward side is separated from the surface of a vehicle body, so that negative pressure is not generated on the side corner on the leeward side, thus decreasing the yawing moment applied to the motor vehicle.

31 Claims, 9 Drawing Sheets

CHARACTERISTICS OF YAW ANGLE ($\psi$)
OF PRESSURE DIFFERENC $\Delta C_P$

YAW ANGLE ($\psi$)

— φ=10°(deg)
--- =20°
—·— =30°

CONSTRUCTION OF SIDE CORNER PORTION OF MOTOR VEHICLE

TECHNICAL FIELD

This invention relates to characteristics of aerodynamics of a motor vehicle, and more particularly to a construction of side corner portions of the motor vehicle.

BACKGROUND ART

When a motor vehicle is subjected to the crosswind during running at high speed, a vehicle body may be carried away to the leeward or the running may become unsteady due to the correcting control by steering against the crosswind.

Furthermore, when the motor vehicle tries to outrun a plurality of large-sized vehicles on the leeward against the crosswind, the motor vehicle is intermittently subjected to the crosswind, whereby, above-described unsteadiness of the running may be caused, and it becomes necessary to perform steering control to correct the running against the unsteadiness.

As means for improving the control stabiltiy of the motor vehicle during running at high speed against the aforesaid crosswind, there is a method of improving the chassis (suspension and tires) or the characteristics of aerodynamics of the body (particularly, decreases in the yawing moment coefficient CY and the lift coefficient CL).

The above-described yawing moment coefficient CY is a coefficient of moment for rotating the vehicle in the lateral direction, and generated when the vehicle is subjected to the crosswind, i.e., the running wind has an yaw angle $\psi$ to the vertical center surface in the longitudinal direction of the vehicle.

This will hereunder be described in detail. As shown in FIG. 11, when a motor vehicle 1 is subjected to the crosswind and the yaw angle $\psi$ of a running wind 2 becomes $\psi \neq 0$, a running wind 2 is divided at left corner portion 3 of a front side of the motor vehicle 1 into two air streams including an air stream flowing along the left side surface of the motor vehicle 1 and another air stream flowing along the front surface and to the right side surface of the motor vehicle 1.

At this time, there occurs a difference in flow velocity between these divided air streams, and a difference in pressure distribution around the vehicle body of the motor vehicle 1 is generated due to the difference in flow velocity as shown in FIG. 11.

As apparent from this drawing, in general, positive pressure is generated at the left side surface on the windward side of the motor vehicle 1 and negative pressure is generated at the right side surface on the leeward side.

Consequently, due to this difference in pressure, a moment for rotating the motor vehicle 1 to the right in the drawing is generated to the motor vehicle, and this coefficient is the above-described yawing moment coefficent CY.

Here, the relationship between the yaw angle $\psi$ and the yawing moment coefficient CY differs depending on the configuration of the vehicle body, however, in general, CY has the maximum value in the proximity of $\psi = 25°$.

The characteristics of CY as described above is mainly due to change in pressure (change in flow velocity) on the leeward side, i.e., in the right side corner portion of the motor vehicle 1 in the drawing.

More specifically, on the leeward side in the right corner portion 4 of the front side, the air stream flows along the outer surface of the vehicle body, and, even when the air stream is separated, the air stream is immediately attached again, so that the flow velocity is high and the negative pressure is high.

When the yaw angle reaches a certain value (in general, 25°–30°) or thereabove, the air stream is separated the outer surface of the vehicle body in the corner portion of the front side, whereby the negative pressure is lowered as compared with that when the air stream flows along the outer surface of the vehicle body.

Consequently, it is known that, when this corner portion is made angular or the radius of curvature thereof is decreased, separation of the air stream occurs and the yawing moment coefficient CY is reduced.

Now, regarding the relationship between the yawing moment coefficient CY and the drag coefficient CD, when the radius of curvature of the corner portion of the front side of the motor vehicle is decreased to reduce the yawing moment coefficent CY, the drag coefficient CD becomes high, whereby such a problem is presented that an adverse influence such as increased fuel consumption and the like is caused.

To obviate this problem, in Japanese Utility Model Application No. 188900/1983, the present application proposed a construction of front side portions of a motor vehicle, wherein turbulent fins forwardly protruded from a vehicle body are secured to a branching position where the running wind from the directly forward direction of the vehicle body is divided into the upward and the lateral directions in a front side corner portion of the vehicle body.

The above-described construction of the front side portion of the motor vehicle presents the problem that the yawing moment coefficient CY can be decreased without increasing the drag coefficient CD, however, the turbulent fins become large-sized.

To obviate this problem, further, in Japanese Utility Model Application Nos. 79241/1984 and 134037/1984, the present applicant proposed a construction of a front side portions of a motor vehicle, wherein the construction is compact in size, and the yawing moment coefficient CY can be decreased without increasing the drag coefficient CD.

However, in all of the above-described construction of the front side portions, the turbulent fins are protruded from the front side portions, whereby the appearance of the vehicle is lowered, and, there is such a problem that, when the yaw angle is larger than a certain degree, the effect of decreasing the yawing moment coefficient CY is high, and, when the yaw angle is small, improvements are limited.

Similar problems are presented on the rear side portions of the motor vehicle as will be described hereunder.

In recent years, in some of the three-box cars and fastback cars, in order to reduce the drag coefficient CD and to decrease the air resistance FD during running, the shape of a rear quarter portion from a quarter pillar to a rear window is stream-lined, in which the radius of curvature is made large.

However, in the vehicles, wherein the shape of the rear quarter portion is stream-lined by increasing the radius of curvature, the drag coefficient CD can be decreased, on the contrary, there is such a problem that the yawing moment coefficient CY is increased.

In contrast thereto, such vehicles have been commercialized that fins are secured to the rear quarter portions, and air stream flowing along the rear quarter portions are actively separated from the surface of the rear quarter portions by use of the fins.

Furthermore, in order to decrease the yawing moment coefficient CY, the present applicant proposed a vehicle, in Japanese Utility Model Kokai (Laid-Open) No. 143985/1982, wherein movable fins which are each selectively, positionally adjustable to a stored position within a compartment and a protruded position from a compartment, are provided at the right and left rear quarter portions of the vehicle.

However, such a problem is presented that, when the fins are secured to the rear quarter portions to decrease the yawing moment coefficient CY, the fins are formed protrudingly from the rear quarter portions, the drag coefficient CD cannot be made further smaller. Particularly, in the vehicles, wherein body surface is flushed, it is not preferably to protrude the fins from the rear quarter portions.

Furthermore, the vehicle proposed in the aforesaid Utility Model Kokai (Laid-Open) No. 143985/1982 presents the problem that the fins are made movable, whereby the arrangement becomes complicated.

The present invention has as its object the provision of a construction of side corner portions of a motor vehicle, wherein the yawing moment coefficient CY can be decreased without providing protruding vehicles such as a turbulent fins on the side corner portions and increasing the drag coefficient CD.

SUMMARY OF THE INVENTION

To achieve the above-described object, the present invention contemplates in forming air blow-out openings at positions close to the side corner portions of the vehicle body.

Furthermore, to achieve the above-described object, the present invention contemplates in providing air intake openings at portions of the vehicle body where positive pressure is generated during receiving the crosswind, and in feeding air from the aforesaid air intake openings to aforesaid air blow-out openings.

According to the present invention, air is blown from the air blow-out openings formed on the side corner portions, whereby separation of the air stream on the side corner portion is furthered, when the motor vehicle is subjected to the crosswind, the yawing moment coefficient can be decreased, and, when the motor vehicle is not subjected to the crosswind, the air stream on the front corner portion cannot be disturbed, whereby the drag coefficient CD is not increased.

Furthermore, to achieve the above-described object, respective air blow-out openings are formed at positions close to the right and left side corner and these right and left air blow-out openings are connected to each other through a duct.

According to the present invention, air is blown out through the air blow-out openings formed on the right and left side corner portions, whereby separation of the air streams on the side corner portions is furthered, when the motor vehicle is subjected to the crosswind, the yawing moment coefficient can be decreased and, when the motor vehicle is not subjected to the crosswind, the air streams on the side corner portions cannot be disturbed, whereby the drag coefficient CD cannot be increased.

Here, the air blow-out openings formed on the right and left side corner portions are connected to each other through the duct, whereby, even when a radiator or a condenser of an air conditioner is provided on the front portion of the motor vehicle, air is not blown out through the air blow-out openings during straight line running with no crosswind.

Furthermore, to achieve the above-described object, the present invention contemplates in a construction provided with right and left air blow-out openings formed at positions close to the right and left side corners; crosswind sensing means for sensing the crosswind applied to the vehicle body; fans disposed at the right and left air blow-out openings for forcedly blowing out air through the air blow-out openings; and a control device for driving the fan provided at the air blow-out opening on the leeward side of the crosswind in response to an output signal from the crosswind sensing means.

Additionally, to achieve the above-described object, the fan is driven in accordance with the magnitude of an output signal from the crosswind sensing means.

According to the present invention, when the crosswind is received, the leeward is sensed and air is forcedly blow out by the fan through the air blow-out opening formed on the side corner portion on the leeward side, whereby separation of the air stream on the side corner portion can be furthered, when the motor vehicle is subjected to the crosswind, the yawing moment coefficient can be decreased, and, when the crosswind is not received, the air stream on the front corner portion cannot be disturbed, whereby the drag coefficient CD cannot be increased.

Further, to achieve the above-described object, according to the present invention, there are provided air blow-out openings on the right and left rear quarter portions and air intake openings, which are communicated with the air blow-out openings, and the air intake openings are opened at positions on the outer surface of the body, having such a relationship in pressure difference between the air blow-out opening and the air intake opening is established that, when the crosswind is not received during running, an absolute value of the pressure difference between the air blow-out opening and the air intake opening becomes low, whereby air is not blown out through the air blow-out opening, and, when the crosswind is received during running, an absolute value of the pressure difference between the air blow-out opening and the air intake opening becomes high, whereby air is blown out through the air blowout opening.

Furthermore, to achieve the above-described object, according to the present invention, the air blow-out openings are each formed in a longitudinal slit shape along the rear end edge of the outer surface of the quarter pillar.

Additionally, to achieve the above-described object, according to the present invention, the air intake openings are formed on a quarter panel positioned below the air blowout openings.

According to the present invention, the air blow-out openings are provided on the right and left rear quarter portions from the quarter pillar to the rear window, these air blow-out openings are communicated with the air intake openings opened on the outer surface of body, the air intake openings are opened at positions on the outer surfaces of the body, where such a relationship in pressure difference between the air intake opening and the air blow-out opening is established that, when the crosswind is not received during running, an absolute value of the pressure difference between the air blow-out opening and the air intake opening becomes low, air is not blown out through the air blow-out opening, and, when the crosswind is received during running, an absolute value of the pressure difference between the air blow-out opening and the air intake opening becomes high, whereby air is blown out through the air blow-out opening, so that the air streams flowing along the rear quarter portion can be actively separated from the surface of the rear quarter portion, negative pressure generated on the outer surface of the rear quarter portion due to the air stream flowing along this rear quarter portion can be decreased to reduce the yawing moment MY.

DETAILED DESCRIPTION OF THE PREFERRED EMBODIMENTS AND BEST MODE FOR CARRYING OUT THE INVENTION

Embodiment of the present invention will hereunder be described with reference to the drawings.

Figure 1:
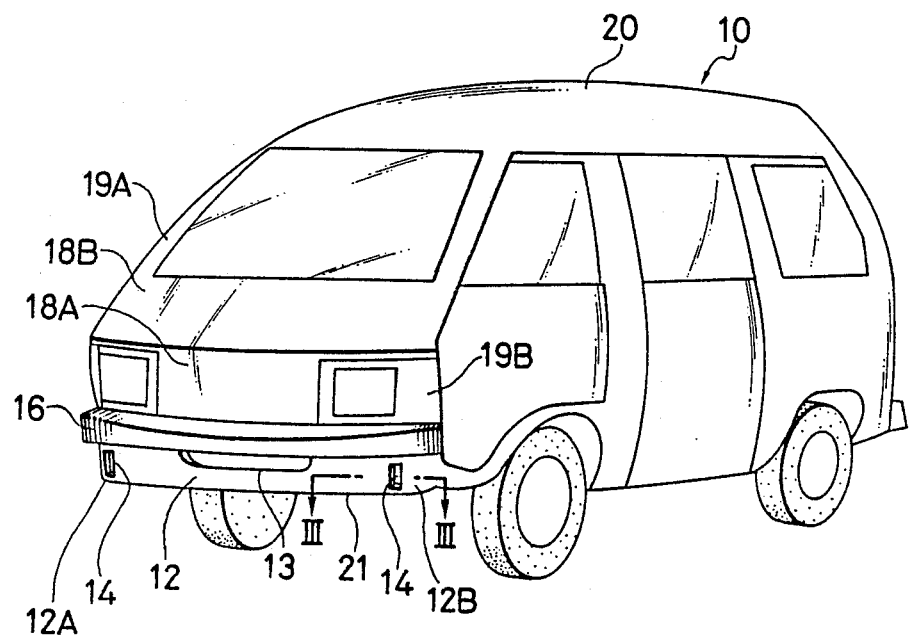
FIG. 1 is a perspective view showing one embodiment of the construction of the front side portion of a motor vehicle according to the present invention.
Figure 2:
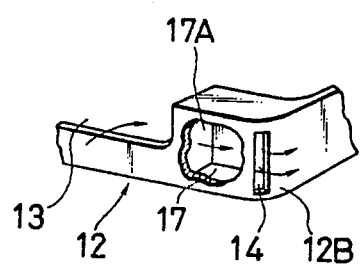
FIG. 2 is a perspective view enlarged showing the essential portion of the above embodiment.
Figure 3:
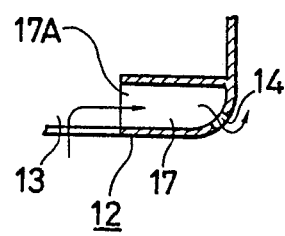
FIG. 3 is an enlarged schematic sectional view taken along the line III—III in FIG. 1.

As shown in FIGS. 1 to 3, the first embodiment of the present invention is of such an arrangement that air blow-out openings 14 are formed at positions close to side corner portions 12A and 12B of a front balance panel 12 of a vehicle body of a motor vehicle 10.

On the front balance panel 12 formed with the air blow-out openings, an opening 13 is formed at position in the central portion in the width direction of the vehicle body and adjacent to the underside of a front bumper 16, further, as shown in FIGS. 2 and 3, the side corner portions are each formed of a hollow member constituting a duct 17 and being provided with an air intake portion 17A at a position communicating with a being faced to the opening 13.

The air blow-out openings 14 are each formed into a vertically elongated slit shape at positions opposite to the air intake opening 17A of duct 17.

Designated at 18A and 18B are front panels, 19A and 19B front side corners of the vehicle body, 20 a roof and 21 an undersurface of a floor of the vehicle body, respectively.

If the air blow-out openings 14 are provided at the positions close the above-described front corner portions, then, when the yaw angle $\psi=0$, i.e., the crosswind is received, as shown in FIG. 3, the air stream flowing on the side surface on the leeward side of the vehicle body along the front balance panel 12 of the motor vehicle 10 from the windward side is separated from the surface of the vehicle body by the air stream blown out from the air blow-out opening 14, whereby the air flow velocity is lowered, so that the negative pressure on this portion is reduced.

Accordingly, by the above-described separation of the air stream from the surface of the vehicle body, the yawing moment coefficient CY due to the different between the pressure applied to the right and left side surfaces of the motor vehicle 10 is reduced.

Here, the air to be blow out through the air blow-out opening 14 is taken in through the opening 13 formed at he central portion of the front balance panel 12 when the crosswind is received during running of the motor vehicle 10, and fed to the air blow-out opening 14 through the air intake opening 17A and the duct 17.

When the motor vehicle 10 is driven with receiving no crosswind, the amount of air taken in through the opening 13, passed through the air intake opening 17A and the duct 17, and blown out through the air blow-out opening 14 is very low, whereby no separation of the air stream on the corner portions occurs, so that the drag coefficient CD is not increased.

Figure 4:
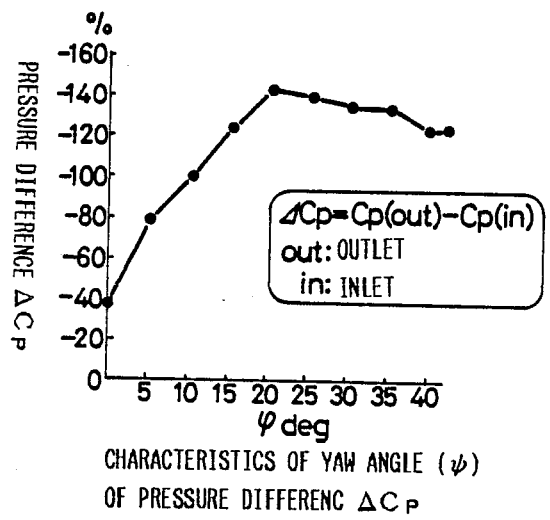
FIG. 4 is a chart showing the relationship between the yaw angle of the crosswind applied to the motor vehicle and a pressure difference between pressure at the inlet side and the outlet side of the air duct.

This principle is shown in FIG. 4.

The relationship between a pressure difference ΔCP between a coefficient CP (out) at the air blow-out opening 14 and a coefficient CP (in) at the air intake opening 12 and the yaw angle is determined such that, as the yaw angle is increased, ΔCP, i.e., negative pressure applied to the air blow-out opening 14 is increased, and, when the crosswind is not received, ΔCP becomes minimal, whereby the intensity of the air blown out through the air blow-out opening 14 is automatically regulated in accordance with the yaw angle of the crosswind applied to the motor vehicle 10.

Figure 5:
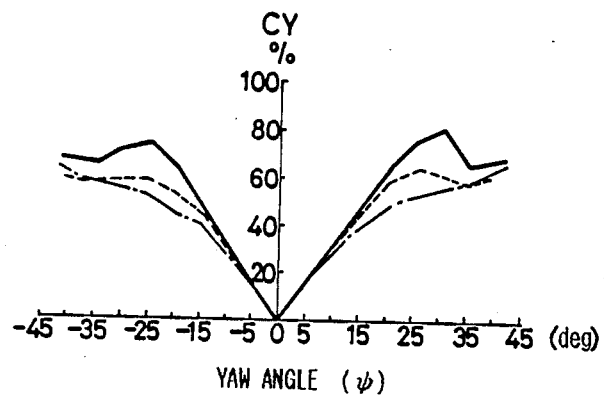
FIG. 5 is a chart showing the effects of the present invention in the relationship between the yaw angle and the moment coefficient.

According to experiments conducted by the inventor of the present invention, the results shown in FIG. 5 were obtained.

Figure 6:
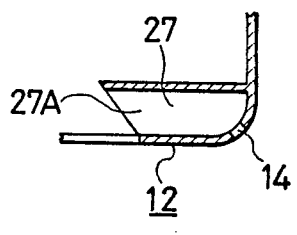
FIG. 6, 7, 8, 9 and 10 are perspective views showing the essential portions of second to sixth embodiments of the present invention.

More specifically, in FIG. 5, solid lines indicate the case where the air blow-out openings according to the present invention were not provided, broken lines indicate the case where the arrangement in the above embodiment was used, and one-dot chain lines indicate the case where the embodiment shown in FIG. 6 to be described hereunder was adopted. As apparent from the drawings, according to the present invention, it was possible to decrease the yawing moment coefficient CY by 20–30%.

Furthermore, when the crosswind was not received, there was almost no blow-out of air through the air blow-out opening 14, whereby no separation of the air stream on the corner portions occurred, so that no deterioration of the drag coefficient CD was ascertained.

The second embodiment of the present invention was shown in FIG. 6 will hereunder be described.

This second embodiment is of such an arrangement that an air intake opening 27A in the front balance panel 12 is inclined, so that air stream from the front of the motor vehicle 10 can be easily taken into a duct 27.

Incidentally, in the above embodiment, the air to be blown out through the air blow-out opening 14 is taken into the duct 27A through the opening 13 formed on the central portion in the width direction of the front balance panel 12, however, the present invention need not be limited to this. More specifically, any portion of the vehicle body, where positive pressure is generated when the crosswind is received may be adopted. For example, similarly to the third and fourth embodiments of the present invention as shown in FIGS. 7 and 8, air intake openings 37A and 47A may be provided on the front surface of the front balance panel 12.

Figure 7:
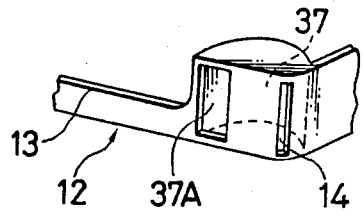

Here, the duct 37 of the third embodiment shown in FIG. 7 is formed similarly to those in the first and second embodiments by making the corner portions of the front balance panel 12 hollow.

Figure 8:
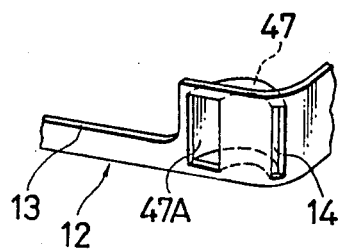

Furthermore, in the fourth embodiment shown in FIG. 8, a separate member is used to form a duct 47 on the rear surface of the front balance panel 12.

Figure 9:
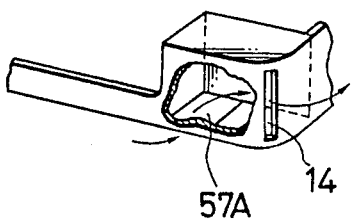

Moreover, similarly to the fifth embodiment of the present invention shown in FIG. 9, air intake openings 57A may be formed on the undersurface of the front balance panel 12.

Additionally, in the above embodiment, the air blow-out openings 14 are formed on the front balance panel 12, however, the present invention need not be limited to this. In short, the air blow-out openings may be any ones only if they are formed on the front side corner portions.

Figure 10:
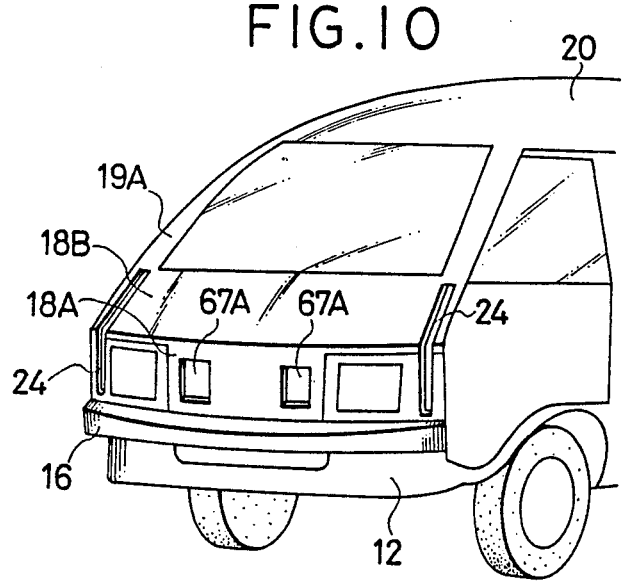
Figure 11:
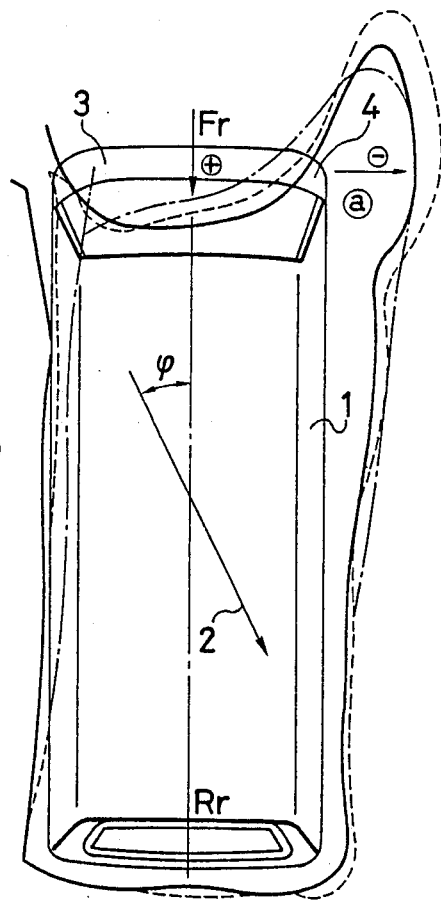
FIG. 11 is a plan view showing the distribution of the pressure on the outer surface of the vehicle body when the motor vehicle is subjected to the crosswind.

Accordingly, similarly to the sixth embodiment of the present invention as shown in FIG. 10, air blow-out openings 24 may be formed on the front panels 18A and 18B of the motor vehicle 10.

In this case, an air intake opening 67A is formed on the front panel 18A.

The seventh embodiment of the present invention will hereunder be described.

Figure 12:
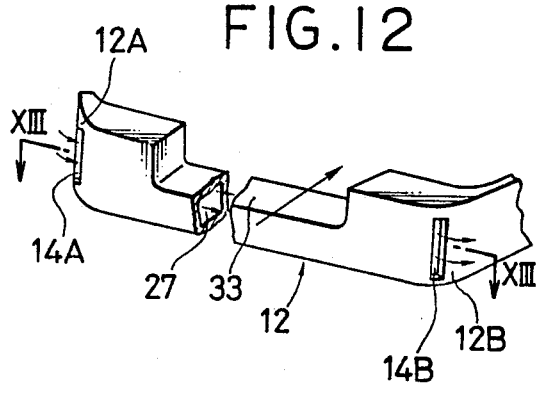
FIG. 12 is a perspective view enlargedly showing the essential portions of a seventh embodiment of the present invention.
Figure 13:
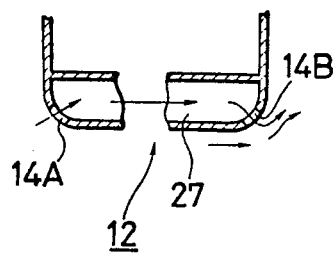
FIG. 13 is an enlarged schematic sectional view taken along the line XIII—XIII in FIG. 12.

As shown in FIGS. 12 and 13, in this embodiment, air blow-out openings 14A and 14B are formed at positions close to the right and left side corner positions 12A and 12B of the front balance panel 12 of the vehicle body of the motor vehicle 10, and these right and left air blow-out openings 14A and 14B are connected to each other through a duct 27 at the rear side of the front balance panel 12.

As shown in FIGS. 12 and 13, the front balance panel 12 formed thereon with the air blow-out openings 14A and 14B is formed into the hollow member constituting the duct 27, and further, formed at the central portion in the width direction of the vehicle body and adjacent to the underside of the front bumper 16 with a recess 33.

The air blow-out openings 14A and 14B are each formed into a vertically elongated slit shape.

In this embodiment, the right and left air blow-out openings 14A and 14B are communicated with each other through the duct 27, and there is no other inlet or outlet for air, whereby, for example, when the motor vehicle runs in straight line with receiving no crosswind, the pressure difference CP between these right and left air blow-out openings 14A and 14B comes to be zero.

Accordingly, theoretically, the quantity of air blown out through the air blow-out opening 14A or 14B becomes zero.

In this embodiment, even in the motor vehicle provided in the front portion thereof with a radiator, a condenser of an air conditioner and the like, during straight line running of the motor vehicle with receiving no crosswind, the drag coefficient is not increased.

More specifically, in the case where the air intake openings for feeding air to the air blow-out openings on the side corner portion are provided at the rear side of the front bumper, for example, and, when the radiator and the air condenser are provided in the front, as seen in passenger cars, some of the so-called one-box bars, even when the motor vehicle runs in straight line with receiving no crosswind, positive pressure is generated in the front of the motor vehicle by the radiator and the condenser of the air conditioner, whereby the air pressure at the air intake opening is raised, air is blown out through the air blast-out opening and the drag coefficient CD may be increased. The above embodiment is free from this.

The eighth embodiment of the present invention will hereunder be described with reference to FIGS. 14 to 17.

In this eighth embodiment, the air blow-out openings 14A and 14B are formed at positions close to the right and left side corner portions 12A and 12B on the front balance panel 12 of the vehicle body of the motor vehicle 10, and there are provided: crosswind sensing means 5 for sensing the direction of the crosswind applied to the vehicle body; fans 6A and 6B which are provided at the right and left air blow-out openings 14A and 14B, for forcedly blowing out the air through the right and left air blow-out openings 14A and 14B; and a control device 7 for driving the fan 6A or 6B which is provided at the air blow-out opening 14A or 14B disposed on the leeward side of the crosswind in response to an output signal from the crosswind sensing means 5.

Figure 15:
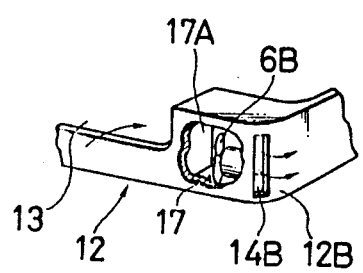
FIG. 15 is a perspective view enlargedly showing the essential portion of the eighth embodiment.
Figure 16:
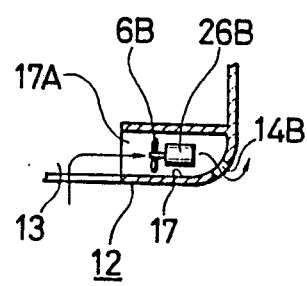
FIG. 16 is an enlarged schematic sectional view taken along the line XVI—XVI in FIG. 14.

The front balance panel 12 formed thereon with the air blow-out openings 14A and 14B is formed at the central portion in the width direction of the vehicle body and adjacent to the under side of the front bumper 16 with an opening 13, and as shown in FIGS. 15 and 16, the side corner portion is formed into a hollow member constituting the duct 17, and an air intake opening 17A is provided at a portion faced to the opening 13.

The fans 6A and 6B are provided in the duct 17.

The air blow-out openings 14A and 14B are formed into vertically enlongated slip shapes at positions opposite to the air intake opening 17A in the duct 17.

The crosswind sensing means 5 includes a pair of right and left pressure sensors 25A and 25B which are secured to positions close to the forward ends of right and left side doors.

Furthermore, the control device 7 includes a computer, a pressure transducer and the like, which are adapted to sense the leeward when the motor vehicle 10 is subjected to the crosswind due to the difference between pressure applied to the pressure sensors 25A and 25B, and to drive motors 26A, 26B of fans 6A or 6B in accordance with the pressure difference.

Here, the control device 7 is subjected to control a voltage V of a current for driving the motors 26A and 26B of the vans 6A and 6B in proportion to a difference $\Delta P$ between sensor outputs PA and PB from the pair of pressure sensors 25A and 25B.

Furthermore, when $PA-P=\Delta P$ is positive and higher than a preset value k, the crosswind is determined to come from the right forward direction, whereby the fan 6B on the leeward side is driven. While, when PA−PB is lower in value than −k, the crosswind is determined to come from the left forward direction, whereby the fan 6A disposed at the opposite position is driven.

Figure 17:
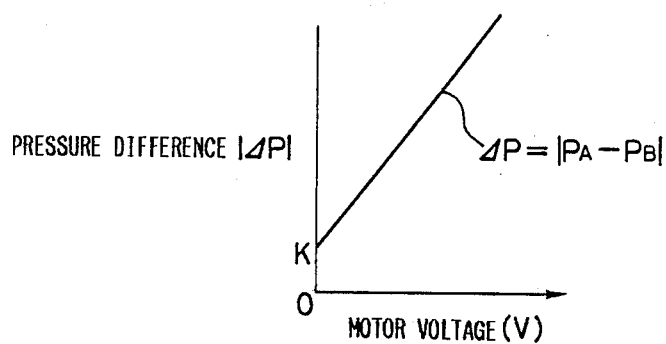
FIG. 17 is a characteristic diagram showing the relationship between pressure difference detected by the crosswind sensing means and the motor voltage for driving the fan in the above embodiment.

More specifically, the voltage of the motors 26A and 26B of the fans 6A and 6B is controlled by the control device 7 on the basis of the characteristics shown in FIG. 17.

Figure 14:
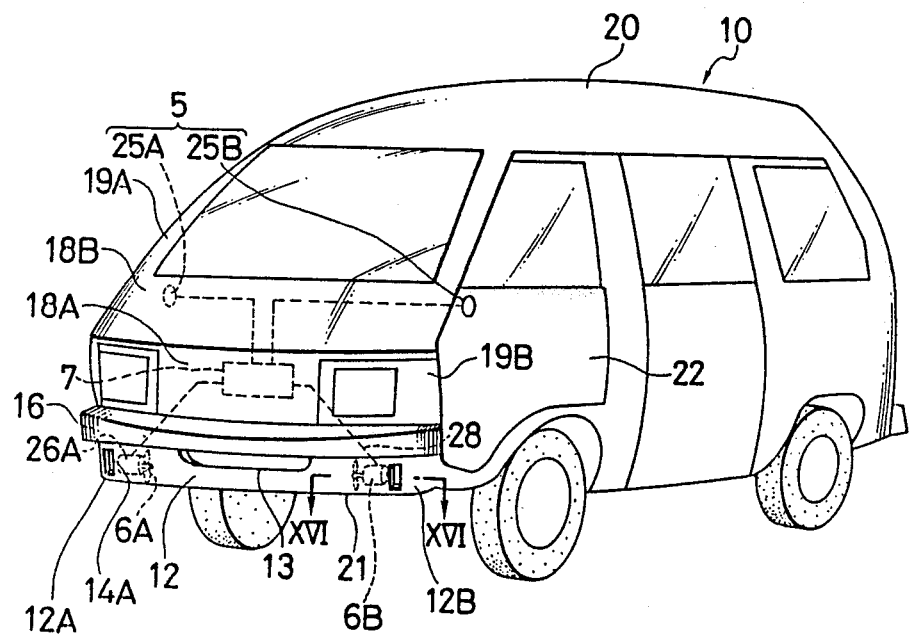
FIG. 14 is a perspective view showing an eighth embodiment of the present invention.

Designated at 28 in FIG. 14 is a control line for connecting the motors 26A, 26B to the control device 7.

Action of the above embodiment will hereunder be described.

When the motor vehicle 10 receives the crosswind from the right forward direction during running for example, a pressure difference is generated between the right and left sides of the vehicle body. This pressure difference is sensed by the pressure sensors 25A and 25B, and, the outputs from the respective sensors are indicated by PA and PB. When $PA-PB=\Delta P>k$, the control device 7 determines the crosswind to come from the right forward direction, drives the motor 26B of the fan 6B on the left side, and controls the motor voltage V in proportion to the pressure difference $\Delta P$ on the basis of the characteristics shown in FIG. 17.

In the state where the crosswind is received from the right forward direction, as shown in FIG. 16, the air stream flowing from the windward side, along the front balance panel 12 of the motor vehicle 10 to the side surface of the vehicle body on the leeward side is separated from the surface of the vehicle body by the air stream forcedly blow out by the fan 6B through the air blow-out opening 14B, whereby the air flow velocity is lowered, so that negative pressure in this portion is reduced.

Accordingly, the above-described separation of the air stream from the surface of the vehicle body decreases the yawing moment coefficient CY due to the difference between the pressures applied to the right and left side surfaces of the motor vehicle 10.

Here, the air to be blown out through the air blow-out opening 14B is taken in through the opening 13 formed at the central portion of the front balance panel 12 when the motor vehicle 10 runs with receiving the crosswind, and fed to the air flow-out opening 14B through the air intake opening 17A and the duct 17.

When the motor vehicle 10 is driven with receiving no crosswind, the fans 6A and 6B are stoped operating, the amount of air blown out from the air blow-out openings 14A and 14B through the opening 13, the air intake opening 17A and the duct 17 is very low, being resisted in ventilation even by the fans 6A and 6B, whereby no separation of air stream on the corner portion occurs, so that the drag coefficient CD is not increased.

Figure 18:
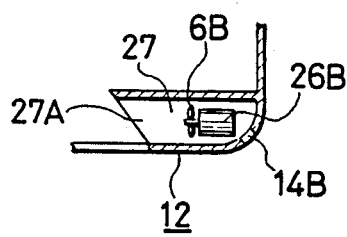
FIG. 18 is a sectional view showing a ninth embodiment of the present invention.

The ninth embodiment of the present invention as shown in FIG. 18 will hereunder be described.

In this ninth embodiment, an air intake opening 27A of the front balance panel 12 is inclined, so that air stream from the front of the motor vehicle can be easily taken into a duct 27.

Figure 19:
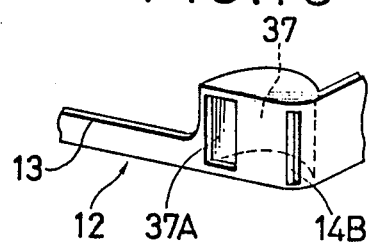
FIGS. 19, 20 and 21 are perspective view showing the essential portions of tenth to twelfth embodiments of the present invention.
Figure 20:
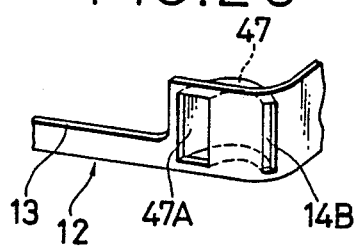

Incidentally, in the above embodiment, the air to be blown out through the air blow-out openings 14A and 14B is taken into the duct 27A through the opening 13 formed at the central portion in the width direction of the front balance panel 12, however, the present invention need not be limited to this, and air intake openings 37A and 47A maybe provided in the front surface of the front balance panel 12 similarly to the tenth and the eleventh embodiments as shown in FIGS. 19 and 20 for example (fans and motors are not shown). The right and left air intake openings 37A and 47A maybe connected to each other through a duct, whereby either one can alternately function as the air intake opening for the air blow-out opening, as in the seventh embodiment shown in FIG. 12.

Here, a duct 37 in the tenth embodiment shown in FIG. 19 is formed similarly to the eighth and ninth embodiments by making the corner portion of the front balance panel 12 hollow.

Furthermore, in the eleventh embodiment shown in FIG. 20, a separate member is used to form a duct 47 on the rear surface of the front balance panel 12.

Figure 21:
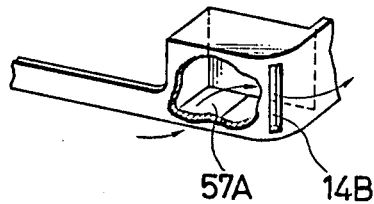

Moreover, similarly to the twelfth embodiment of the present invention as shown in FIG. 21, air intake openings 57A may be formed on the undersurface of the front balance panel 12 (fans and motors are not shown).

Furthermore, in the above embodiment, the direction and intensity of the crosswind are detected by a pair of pressure sensors 25A and 25B, however, the present invention need not be limited to this, and, for example, any other crosswind sensing means such as pressure switches actuated by a difference between pressure at opposite side positions of the vehicle body may be adopted.

The thirteenth embodiment of the present invention will hereunder be described with reference to FIGS. 22 to 25.

In this embodiment, the crosswind sensing means itself in the eighth embodiment shown in FIGS. 14 to 16 is made to output a signal in accordance with the direction and intensity of the crosswind.

Figure 22:
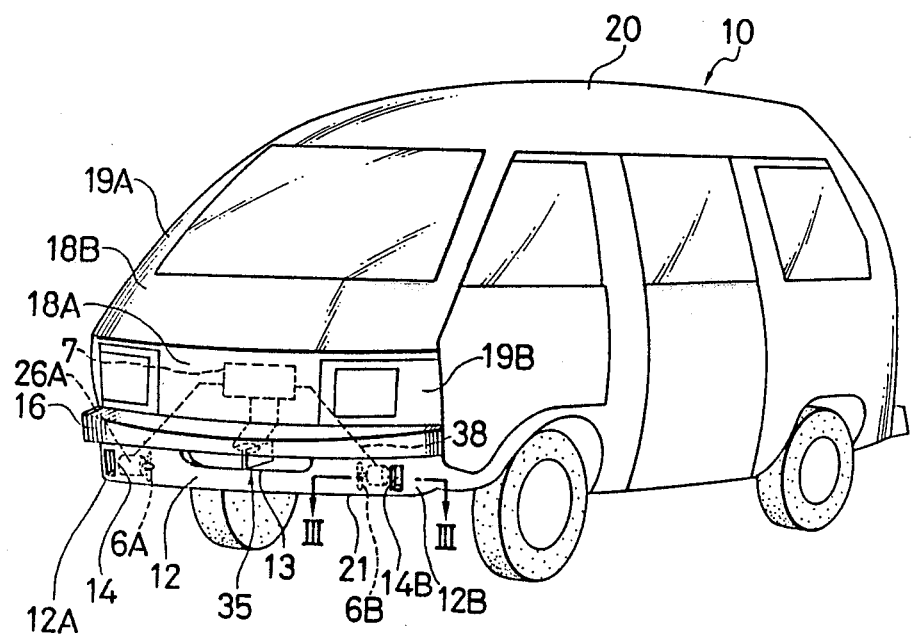
FIG. 22 is a perspective view showing a thirteenth embodiment of the present invention.
Figure 23:
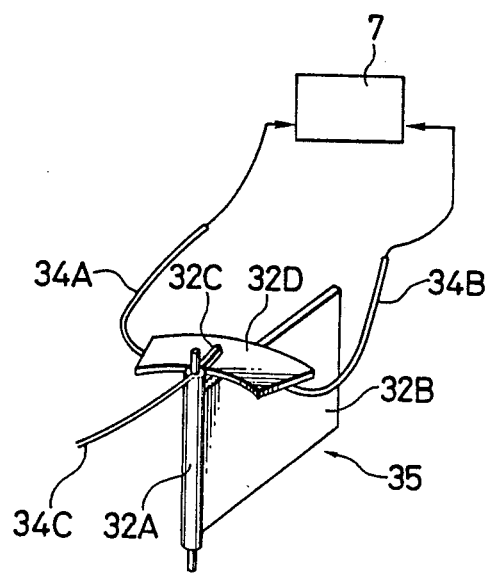
FIG. 23 is a perspective view enlargedly showing the crosswind sensing means in the above embodiment.

As shown in FIGS. 22 and 23, the crosswind sensing means 35 in this embodiment includes: an oscillatory shaft 32A vertically provided at a forward end position of the center of the opening 13 formed in the front balance panel 12; a wind direction indicating plate 32B integrally formed with this oscillatory shaft 32A and formed of a thin plate; a sliding element 32C secured to the top end of the oscillator shaft 32A; a variable resister 32D generally horizontally positioned being faced to the top end of the oscillatory shaft 32A, and brought into sliding contact with the sliding element 32C when the sliding element 32C oscillates together with the oscillatory shaft 32A and the wind direction indicating plate 32B.

Designated at 34A and 34B in the drawing are lead lines for delivering a change in the resistance value of the variable resistor 32D due to the oscillation of the sliding element 32C to the control device 7 as an analog signal, and 34C a lead line reaching a power source, respectively.

Figure 24:
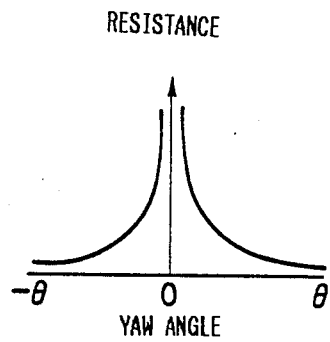
FIG. 24 is a characteristic diagram showing the relationship between the yaw angles detected by the crosswind sensing means and outputs from the crosswind sensing means in the above embodiment.

Furthermore, as shown in FIG. 24, this crosswind sensing means 35 indicates an infinite resistance value when the motor vehicle runs in straight line with receiving no crosswind, i.e., the yaw angle $\theta = 0$, and the resistance value decreases with increases of the yaw angle.

The control device 7 includes a computer, a pressure transducer and the like, which are adapted to sense the leeward when the motor vehicle 10 is subjected to the crosswind according to the output of the variable resistor 32D and to drive the motors 26A and 26B of the fan 6A or 6B in accordance with the yaw angle.

Here, the control device 7 controls the voltage V of the current for driving the motors 26A and 26B of the fans 6A and 6B in inverse proportion to a resistance value of the variable resistor 32D.

Designated at 38 in FIG. 22 is a control line for connecting the motors 26A, 26B to the control device 7.

Action of the above embodiment will hereunder be described.

Figure 25:
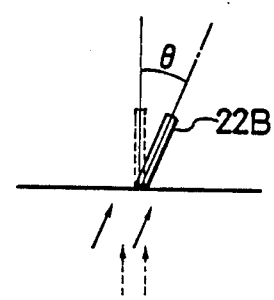
FIG. 25 is a chart showing the positional relationship between the yaw angles of the crosswind applied to the motor vehicle and the wind direction indicating plate in the crosswind sensing means.

When the motor vehicle 10 is subjected to the crosswind from the right forward direction during running for example, the wind direction indicating plate 32B is oscillated clockwise in FIG. 25 from a neutral line as much as the yaw angle of this crosswind.

Accordingly, the sliding element 32C slides on the variable resistor 32D, whereby a resistance value of the variable resistor 32D becomes commensurate to the yaw angle 0. This value is outputted from the side of the lead line 34B to the control device 7.

Incidentally, as for the side of the lead line 34A, since the resistance value of the variable resistor 32D is infinite when the sliding element 32C is at the neutral position, the resistance value should naturally come to be infinite when the sliding element 32C exceeds the neutral position and slides to the other side, so that no change in the resistance value should be outputted from the side of the lead line 34A.

Accordingly, the control device 7 drives the motor 26B of the fan 6B on the left side of the vehicle body.

Furthermore, the motor voltage V at this time becomes inversely proportional to the resistance value shown in FIG. 24, thereby resulting in that the flow velocity of the air blow-out of the fan 6B comes to be commensurate to the yaw angle &74.

In a state where the crosswind is received from the right forward direction, the air stream flowing from the windward side, along the front balance panel 12 of the motor vehicle 10 to the side surface of the vehicle body on the leeward side is separated from the surface of the vehicle body by the air steram forcedly blown out by the fan 6B through the air blow-out opening 14B, whereby the air flow velocity is lowered, so that the negative pressure in this portion in reduced.

Accordingly, the above-described separation of the air stream from the surface of vehicle body decreases the yawing moment coefficient CY due to the difference in the pressure applied to the right and left side surfaces of the motor vehicle 10.

Here, the air to be blown out through the air blow-out opening 14B is taken in through the opening 13 formed at the central portion of the front balance panel 12 during running of the motor vehicle 10 with receiving the crosswind, and is fed to the air blow-out opening 14B through the air intake opening 17A and the duct 17.

Since the wind direction indicating plate 32B of the crosswind sensing means 35 comes to the neutral position when the motor vehicle 10 is driven with receiving no crosswind, the resistance value of the variable resistor 32D comes to be infinite. Consequently, the motors 26A and 26B are not driven, the fans 6A and 6B are stopped operating, the amount of air passed through the opening 13, the air intake opening 17A and the duct 17 and blown out through the air blow-out openings 14A and 14B is very low, being resisted in ventilation even by the fans 6A and 6B, whereby no separation of the air stream on the corner portion occurs, so that the drag coefficient CD is not increased.

Furthermore, in the above embodiment, since the crosswind sensing means 35 is mechanically constituted by the oscillatory shaft 32A, the wind direction indicating plate 32B, the sliding element 32C and the variable resistor 32D, the crosswind sensing means 35 is not damaged by flying stones, splushed mud and the like during running of the motor vehicle as compared with the case where the crosswind is sensed by differential pressure sensors and the like for example, so that the crosswind can be reliably sensed.

The fourteenth embodiment of the present invention will hereunder be described with reference to FIGS. 26 to 28. In this embodiment, the present invention is applied to the rear side corner portions of the upper half portion of the body in a sedan-type motor vehicle.

Figure 26:
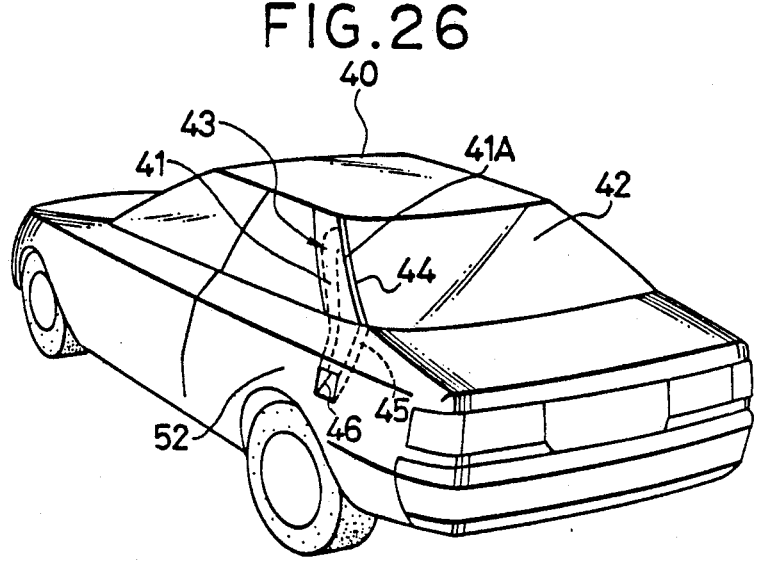
FIG. 26 is a general perspective view showing a fourteenth embodiment of the present invention.

As shown in FIG. 26, this embodiment includes air blow-out openings 44 provided on rear quarter portions 43 from right and left quarter pillars 41 to rear window glasses 42 of a motor vehicle 40, and an air intake opening 46 communicated with this air blow-out opening 44 through a duct 45 and opened to the outer surface of the body, said air intake opening 46 being opened at a position on the outer surface of the body, having such a relationship of pressure difference between the air intake opening 46 and the air blow-out opening 44 that, when the crosswind is not received during running, an absolute value of the pressure difference between the air blow-out opening 44 and the air intake opening 46 becomes low, whereby air is not blown out through the air blow-out opening 44, and, when the crosswind is received during running, an absolute value of the pressure difference between the air blow-out opening 44 and the air intake opening 46 becomes high, whereby air is blow out through the air blow-out opening 44.

The air blow-out openings 44 are each formed into a longitudinal slit shape on the outer surface of the quarer pillar 41 at a position close to and along a rear end edge 41A of the quarter pillar 41.

The air intake openings 46 are each formed on a quarter panel 52 below the air blow-out opening 44.

The duct 45 is provided in the quarter pillar 41.

According to this embodiment, when the crosswind is not received, i.e., the yaw angle is zero, the pressure difference between the air intake opening 46 and the air blow-out opening 44 becomes low, whereby air blow-out from the air blow-out opening 44 is hardly performed, and the air steram during running becomes one flowing along the rear quarter portion 43, so that the air resistance can be decreased, thus enabling to decrease the drag coefficient CD.

Figure 27:
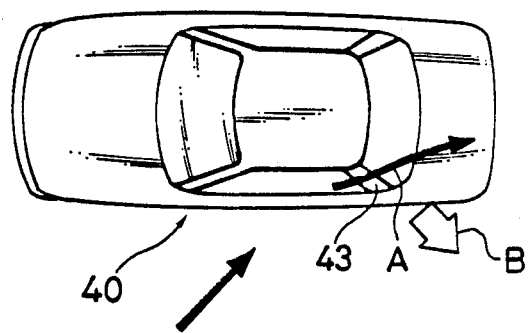
FIG. 27 is a plan view showing the air stream on the rear quarter portion when the crosswind is received in the above embodiment.
Figure 28:
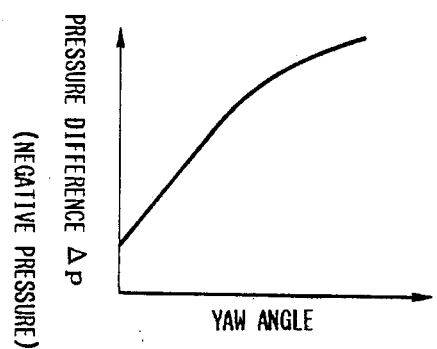
FIG. 28 is a chart showing the relationship between pressure difference between the air blow-out opening and the air intake opening and the yaw angles in this embodiment.
Figure 29:
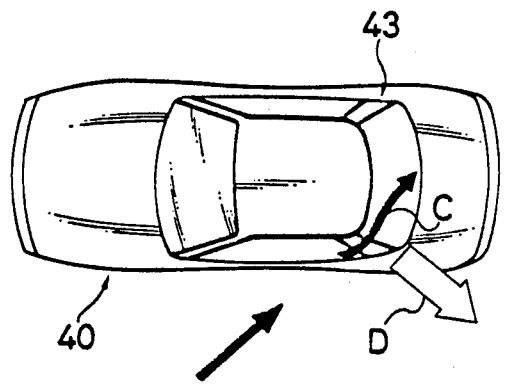
FIG. 29 is a chart showing the air stream on the rear quarter portion of the conventional motor vehicle when the crosswind is received.

Furthermore, when the crosswind is received during running, the pressure difference between the air intake opening 46 and the air blow-out opening 44 becomes high, whereby air is blow out through the air blow-out opening 44, so that the air stream during running is changed from the air stream flowing along the rear quarter portion (refer to an arrow mark C in FIG. 29) to the air stream actively separated from the rear quarter portion 13 (refer to an arrow mark A in FIG. 27). As the result, when the air stream is separated from the rear quarter portion 42 as compared with the case where the air stream during runnng is flowing along the outer surface of the rear quarer portion, as shown in FIG. 27, negative pressure due to the air resistance of the rear quarter portion 42 (refer to an arrow mark B in FIG. 27) can be decreased to a considerable extent. Accordingly, the yawing moment MY which tends to rotate the motor vehicle about a vertical axis passing through the center of gravity of the vehicle can be reduced, so that the yawing moment coefficient CY of the vehicle body can be decreased. Accordingly, the stability of the motor vehicle against crosswind can be improved.

Particularly, in this embodiment, the air blow-out openings 44 are each formed into a longitudinal slit shape on the outer surface of the quarter pillar 41 along the rear end edge 41A thereof, so that most of the air stream flowing along the top surface of the quarter pillar 41 during running can be effectively separated from the rear quarater portion 43. With this arrangement, the yawing moment coefficient CY of the vehicle body can be further decreased.

Furthermore, in this embodiment, the air intake openings 46 are each formed on the quarter panel 52 which is below the air blow-out opening 44, whereby the duct 45 communicating the air blow-out opening 44 with the air intake opening 46 can be formed into a generally straight-lined shaped, so that the ductline resistance can be reduced. Furthermore, the duct 45 can be provided in the quarter pillar 41, so that the appearance in a compartment can be improved.

Incidentally, in the above embodiment, the air intake openings 46 are each opened on the quarter panel 52 which is below the air blow-out opening 44, however, the present invention need not be limited to this, and the opened positions of the air intake openings 46 may be on the roof, the undersurface of a floor or the like for example. In short, the opened positions of the air intake openings 46 may be any positions only if the relationship between the pressure difference P between the air blow-out opening 44 and the air intake opening 46, and the yaw angle can be satisfied, as shown in FIG. 28. More specifically, the positions where the air intake openings are provided may be any positions only if such a relationship can be satisfied that the absolute value of the pressure difference $\Delta P$ between the air blow-out opening 44 and the air intake opening 46 is increased with increase in the yaw angle, whereby air is blown out through the air blow-out opening 44. Incidentally, the pressure difference $\Delta P$ can be calculated as a difference between pressure Pout of the air blow-out opening 44 and pressure Pin of the air intake opening 46 ($\Delta P = \text{Pout} - \text{Pin}$) in the form of negative pressure.

Furthermore, in this embodiment, the slit-shaped air blow-out openings are eached formed on the outer surface of the quarter pillar 41 along the rear end edge 41A of the quarter pillar 41, however, the present invention need not be limited to this, and the air blow-out openings may be each formed on the outer surface of the quarter pillar 41 along the forward end edge of the quarter pillar 41, in the central portion of the outer surface of the quarter pillar in the longitudinal direction of the vehicle, or the like. Further, the slit-shaped air blow-out openings may be each provided between the quarter pillar and a side window glass, between the quarter pillar and a rear window glass, and so on.

Incidentally, in the above embodiment, the air blow-out openings are each provided on either the side corner portion of the front portion of the motor vehicle or the rear side corner portion of the upper half portion of the vehicle body, however, the present invention may be applied to the case where the air blow-out openings are provided on the both side corner portions of the front portion and the rear portion of the vehicle body. Incidentally, those features shown for use on the embodiment of the vehicle front, specifically, a connecting duct, a fan, and a crosswind sensing means, are equally applicable for use in the embodiment of the rear of vehicle.

INDUSTRIAL APPLICABILITY

The present invention with the above-described arrangement is advantageous in that no protruded articles such as turbulent fins are provided, the air resistance coefficient of the motor vehicle is not increased and the yawing moment coefficient is decreased, so that the stability during running of the motor vehicle against crosswind can be improved.

I claim:

1. A construction of side corner portions of a motor vehicle, wherein curved surfaces are located between longitudinal side surfaces and a lateral surface of the vehicle and right and left air blow-out openings are formed into a vertically elongated slit shape on each curved surface to provide an air jet in a direction normal to said curved surface.

2. The constructionn of side corner portions of a motor vehicle as set forth in claim 1, wherein said right and left air blow-out openings are provided on right and left rear quarter portions of the motor vehicle.

3. The construction of side corner portions of a motor vehicle as set forth in claim 1, wherein air intake openings are provided at portions of the vehicle body where positive pressure is generated with receiving the crosswind, and air is fed from said air intake openings to said air blow-out openings.

4. The construction of side corner portions of a motor vehicle as set forth in claim 3, wherein said right and left air blow-out openings are provided on the right and left side corners of a front portion of the motor vehicle.

5. The construction of side corner portions of a motor vehicle as set forth in claim 4 wherein said air intake openings are at a position facing central portion of the vehicle body in a widthwise direction of the vehicle body, said air intake openings communicating with an opening in the front of the motor vehicle.

6. The construction of side corner portions of a motor vehicle as set forth in claim 3, wherein said right and left air blow-out openings are provided on right and left rear quarter portions of the motor vehicle.

7. The construction of side corner portions of a motor vehicle as set forth in claim 6 wherein said air intake openings are located in side surfaces of the vehicle body between the front side corners and the rear side corners.

8. The construction of side corner portions of a motor vehicle as set forth in claim 1, wherein said right and left air blow-out openings are communicated with each other through a duct.

9. The construction of side corner portions of a motor vehicle as set forth in claim 8, wherein said right and left air blow-out openings are provided on the right and left side corners of a front portion of the motor vehicle.

10. The construction of side corner portions of a motor vehicle as set forth in claim 9 wherein said air intake openings are at a position facing a central portion of the vehicle body in a widthwise direction of the vehicle body, said air intake openings communicating with an opening in the front of the motor vehicle.

11. The construction of side corner portions of a motor vehicle as set forth in claim 8, wherein said right and left air blow-out openings are provided on right and left rear quarter portions of the motor vehicle.

12. The construction of side corner portions of a motor vehicle as set forth in claim 1, wherein said right and left air blow-out openings are provided on the right and left side corners of a front portion of the motor vehicle.

13. The construction of side corner portions of a motor vehicle as set forth in claim 12 wherein said air intake openings are at a position facing a central portion of the vehicle body in a widthwise direction of the vehicle body, said air intake openings communicating with an opening in the front of the motor vehicle.

14. The construction of side corner portions of a motor vehicle wherein air blow-out openings are formed respectively at positions close to right and left side corners of a vehicle body, comprising:
  crosswind sensing means for sensing the crosswind applied to the vehicle body;
  fans provided at said right and left air blow-out openings, for forcedly blowing out air through said blow-out openings; and
  a control device for driving said fan provided at the air blow-out opening on the leeward side of the crosswind in response to an output signal of said crosswind sensing means.

15. The construction of side corner portions of a motor vehicle as set forth in claim 14, wherein said right and left air blow-out openings are provided on right and left rear quarter portions of the motor vehicle.

16. The construction of side corner portions of a motor vehicle as set forth in nclaim 15 wherein air intake openings are located in side surfaces of the vehicle body between the front side corners and the rear side corners.

17. The construction of side corner portions of a motor vehicle as set forth in claim 14, wherein said right and left air blow-out openings are provided on the right and left side corners of a front portion of the motor vehicle.

18. The construction of side corner portions of a motor vehicle as set forth in nclaim 17 wherein said air intake openings are at a position facing a central portion of the behicle body in a widthwise direction of the vehicle body,s aid air intake openings communicating with an opening in the front of the motor vehicle.

19. The construction of side corner portions of a motor vehicle as set forth in claim 14, wherein said control device drives said fan in accordance with the magnitude of an output of said crosswind sensing means.

20. The construction of side corner portions of a motor vehicle as set forth in claim 19, wherein said right and left air blow-out openings are provided on the right and left side corners of a front portion of the motor vehicle.

21. The construction of side corner portions of a motor vehicle as set forth in claim 20 wherein said air intake openings are at a position facing a central portion of the vehicle body in a widthwise direction of the vehicle body, said air intake opening communicating with an opening in the front of the motor vehicle.

22. The construction of side corner portions of a motor vehicle as set forth in claim 19, wherein said right and left air blow-out openings are provided on right and left rear quarter portions of the motor vehicle.

23. The construction of side corner portions of a motor vehicle as set forth in claim 22 wherein air intake openings are located in side surfaces of the vehicle body between the front side corners and the rear side corners.

24. The construction of side corner portions of a motor vehicle wherein air blow-out openings are formed respectively at positions close to right and left side corners of a vehicle body; wherein said right and left air blow-out openings are provided on right and left rear quarter portions of the motor vehicle between rear and side vehicle windows; and wherein air intake openings communicating with said blow-out openings are located in side surfaces of the vehicle body between the front side corners and the rear side corners in an area spaced from said vehicle windows.

25. A construction of side corner portions of a motor vehicle, including air blow-out openings provided on curved surfaces of rear quarter portions from right and left quarter pillars to rear window glass in a direction normal to said curved surfaces, and air intake openings communicated with said air blow-out openings and opened to the outer surface of a body, said intake air openings being opened at positions on the outer surface of the body, having such a relationship of pressure difference between said air intake opening and said air blow-out opening that, when the crosswind is not received during running, an absolute value of pressure difference between said air blow-out opening and said air intake opening becomes low, whereby air is not blown out through said air blow-out opening, and, when the crosswind is received during running, an absolute value of pressure difference between said air blow-out opening and said air intake opening becomes high, whereby air is blown out through said air blow-out opening.

26. The construction of side corner portions of a motor vehicle as set forth in claim 25 wherein air intake openings are located in side surfaces of the vehicle body between the front side corners and the rear side corners.

27. The construction of side corner portions of a motor vehicle as set forth in claim 26, wherein said air intake openings are each formed on a quarter panel below said air blow-out opening.

28. The construction of side corner portions of a motor vehicle as set forth in claim 26 wherein said air blow-out openings are each formed into a longitudinal slit shape on the outer surface of a quarter pillar along the rear end edge thereof.

29. The construction of side corner portions of a motor vehicle as set forth in claim 28, wherein said air intake openings are each formed on a quarter panel below said air blow-out opening.

30. Construction of a side corner portion of a vehicle body comprising a lateral surface, longitudinal surface, a generally curved surface extending from the lateral surface to the longitudinal surface, an air outlet port positioned in the curved surface to provide an air jet normal to the curved surface, and means for supplying air under pressure to the outlet port.

31. Construction as in claim 30 wherein the outlet port is located close to the midpoint of said curved surface.

* * * * *